(No Model.)
W. M. BRINKERHOFF.
PICTURE HANGER.
No. 406,623. Patented July 9, 1889.
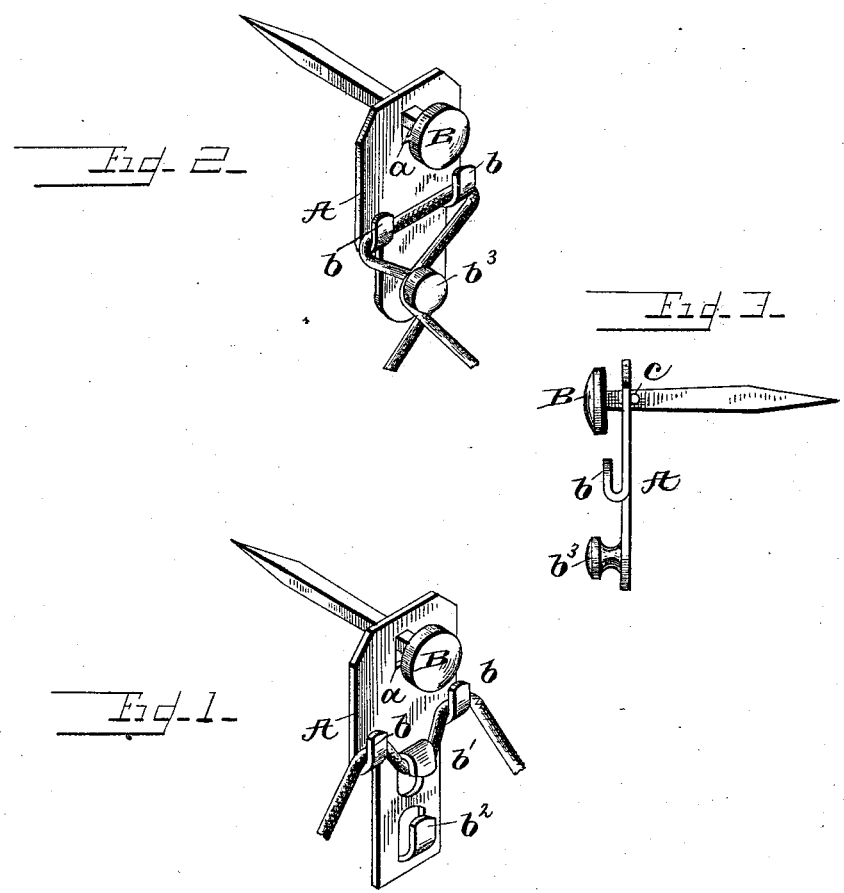
Witnesses
Inventor
Warren M. Brinkerhoff
By his Attorneys

UNITED STATES PATENT OFFICE.

WARREN M. BRINKERHOFF, OF AUBURN, NEW YORK.

PICTURE-HANGER.

SPECIFICATION forming part of Letters Patent No. 406,623, dated July 9, 1889.

Application filed July 1, 1887. Serial No. 243,111. (No model.)

*To all whom it may concern:*

Be it known that I, WARREN M. BRINKERHOFF, a citizen of the United States, residing at Auburn, in the county of Cayuga and State of New York, have invented certain new and useful Improvements in Picture-Hangers; and I do hereby declare the following to be a full, clear, and exact description of the invention, such as will enable others skilled in the art to which it appertains to make and use the same.

My invention is an improvement in picture-hangers; and it consists in improved constructions for sustaining the suspending-cord of pictures and preventing lateral vibratory movement of the hanger and picture. This result is accomplished by peculiar constructions, by which the engagement of the hanger with its supporting device is such as to restrain lateral vibration of the hanger, while the cord is made to engage the hanger, and is so connected thereto that little or no lateral vibration of the picture can take place without the vibration of the hanger, and the locking of the cord thus tends to keep the picture in its proper position.

In the accompanying drawings I have shown several forms in which I have contemplated applying my invention, and my said invention is fully disclosed in the accompanying specification and claim.

Figures 1 and 2 are perspective views of my invention with a single cord-locking projection. Fig. 3 is a side elevation of the devices shown in Fig. 1.

The main body A is provided near its upper end with an elongated or polygonal opening $a$. A nail or screw B, having a polygonal or elongated bearing portion, has such portion passed through and engaging the opening. The opening is made somewhat larger in a vertical direction than the bearing portion of the nail or screw to permit the inclination of the attaching device to the angle desired; but the construction is preferably such that the body A can have but little or no lateral vibration on the attaching device. Almost any form of opening having unequal diameters, with an attaching device with a corresponding part within the same, will accomplish this result.

In Fig. 1 the plate A is provided with cord-supporting hooks $b\ b$, and below these hooks with the hooks $b'$ and $b^2$. The hook $b^2$ may serve, when desired, to support the cord when securing the preliminary adjustment of the picture, and the cord then transferred to the hooks $b\ b$. When the hook $b'$ is used, the inward deflection of the cord is effected between the hooks $b\ b$, which locks the cord from movement on its support.

In Fig. 2 the construction is the same, except that the hooks $b'$ and $b^2$ are dispensed with, and in place thereof a single projection $b^3$ is employed. In this instance in causing the cords to operatively engage the locking projection they are crossed and made to come in contact with each other, forming a very secure locking thereof, but at the same time permitting as ready and easy disengagement of the cords as in the other constructions.

When desired, in these constructions the plate may be placed on the attaching device and fastened thereto, so that the two cannot be readily separated. One method of effecting this is shown in Fig. 3, in which the attaching device is so constructed that it is passed through the plate point first to the proper position, and then is secured by a pin $c$.

What I claim, and desire to secure by Letters Patent, is—

A picture-hanger consisting of a main body provided with means for engaging a support for the same, a cord-support, and a single cord-locking projection extending outward from the facing surface of the main body, said projection being concaved or reduced between its outer end and the main body to form a notch or notches for the reception of the cord, substantially as described.

In testimony whereof I affix my signature in presence of two witnesses.

WARREN M. BRINKERHOFF.

Witnesses:
E. T. WALKER,
L. B. WHITAKER.